United States Patent [19]

Bright

[11] 4,199,008
[45] Apr. 22, 1980

[54] WET SEALED STANDPIPE CAP

[75] Inventor: Robert H. Bright, Pittsburgh, Pa.

[73] Assignee: Koppers Company, Inc., Pittsburgh, Pa.

[21] Appl. No.: 914,629

[22] Filed: Jun. 12, 1978

[51] Int. Cl.² ............................................. F16C 35/00
[52] U.S. Cl. ................................ 137/800; 126/307 R; 137/253; 220/228
[58] Field of Search ............................ 220/228; 138/89; 277/14 R, 14 V, 135; 137/247.05, 251, 253, 800, 247.19; 126/307 R

[56] References Cited

U.S. PATENT DOCUMENTS

| | | | |
|---|---|---|---|
| 1,585,512 | 5/1926 | Roades | 220/228 X |
| 2,946,476 | 7/1960 | Ross | 220/228 |
| 3,187,765 | 6/1965 | Frank | 187/253 |
| 3,721,429 | 3/1973 | Young | 137/253 X |
| 3,925,003 | 12/1975 | Kutler | 137/251 X |

FOREIGN PATENT DOCUMENTS 6706 of 1902 United Kingdom ...................... 220/228

Primary Examiner—Harold W. Weakley
Attorney, Agent, or Firm—R. Lawrence Sahr

[57] ABSTRACT

A wet seal standpipe cap to eliminate standpipe cap leakage includes a generally circular cap which has affixed to the underside of the cap a plurality of baffle rings. The cap is sized to enclose an opening in the top of a standpipe, and permit one of the baffle rings to penetrate a liquor contained in a canal placed around the standpipe opening providing a wet seal. The cap, in cooperation with the canal, entraps any leakage from around the standpipe opening between one of the baffle rings, underside of the cap and contained liquor.

4 Claims, 3 Drawing Figures

WET SEALED STANDPIPE CAP

BACKGROUND OF THE INVENTION

This invention relates to standpipes which are mounted to coke ovens to remove coke oven gases generated during the coking process. More particularly, the invention relates to leakages of gas from a capped opening in the standpipe.

In the coking process, coal is deposited in a coke oven, wherein the coal is baked in a closed environment. By-product volatile substances are produced during the coking process. The by-products are primarily in a gaseous state permeated with particulate matter. The by-products are drawn from a coke oven through a standpipe which is mounted to the top of the coke oven in communication with the oven interior via an oven opening. The standpipe is also in direct communication with a gas collection main wherefrom by-product gases are collected and transported for processing.

Conventionally, standpipes are comprised of a refractory-lined ascension pipe with a gooseneck pipe extension thereto attached. The standpipe is mounted vertically atop a coke oven, the gooseneck portion affixed to a gas collection main. Because the by-product gases carry particulate material, there is a propensity for the particulate material to collect and consolidate in a portion of the gooseneck pipe which, if left unchecked, would obstruct passage through the standpipe. To facilitate the removal of any consolidated material from the interior of the gooseneck pipe, an opening is strategically located in the gooseneck pipe wherethrough one can periodically clean and dislodge any consolidated material therein.

Customarily, a metal standpipe cap encloses the opening in the gooseneck portion of the standpipe during normal operation. The cap is in direct metal-to-metal contact with the rim of the opening, which creates the opportunity for by-product gases to seep from the standpipe between the cap and rim interface. The leaking gas creates an environmentally adverse condition. Conventional soft sealing means cannot be deployed to alleviate standpipe leakage due to the extreme temperature present in the vicinity of the standpipe opening (1500° to 1800° F.) which would destroy conventional soft sealing means.

The present invention provides a means to eliminate standpipe cap leakage.

SUMMARY OF THE INVENTION

A wet sealed standpipe cap to eliminate standpipe cap leakage includes a cap with a plurality of baffle rings affixed to the underside of the cap. The cap is sized to enclose an opening in the top of a standpipe, permitting one of the baffle rings to encircle the opening and penetrate a liquor contained in a canal around the standpipe opening.

The interpositioning of the baffle rings, contained liquor, and underside of the cap to the standpipe opening creates a chamber which contains and prevents escape of gases which are traveling within the standpipe. A second wet seal means is provided to accommodate gas pressure anomalies within the standpipe.

BRIEF DESCRIPTION OF THE PREFERRED EMBODIMENT

Figure 1:
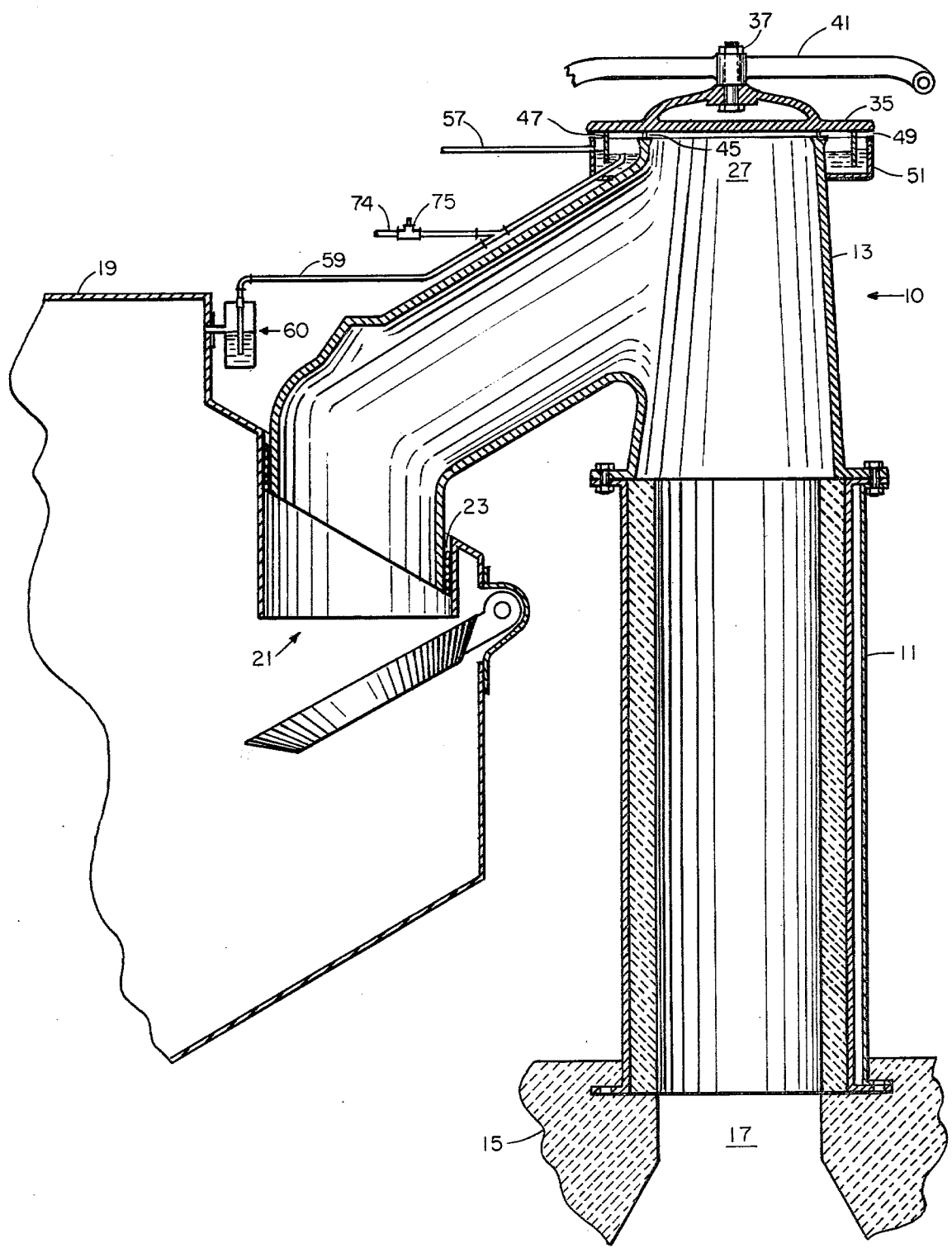
FIG. 1 is a side sectional view of a standpipe.

Referring to FIG. 1, a standpipe, generally indicated as 10, includes a refractory-lined ascension pipe 11 and a gooseneck pipe 13. The ascension pipe 11 has one end vertically mounted by any conventional means to the roof of a coke oven 15 over the oven gas discharge hole 17. Mounted by any conventional means to the other end of the ascension pipe 11 is the gooseneck pipe 13. The standpipe 11 communicates directly to a gas collection main 19 via a gas collection main opening 21. One end of the gooseneck pipe 13 is inserted into the gas collection main opening 21. Sealing means 23, for example, heat treated silicone rubber seals, seals that portion of the gooseneck pipe 13 which is inserted into the gas collection main opening 21 to prevent the escape of gas therefrom and accommodate thermal expansion of that portion of gooseneck pipe 13 in the gas collection main opening 21.

Figure 2:
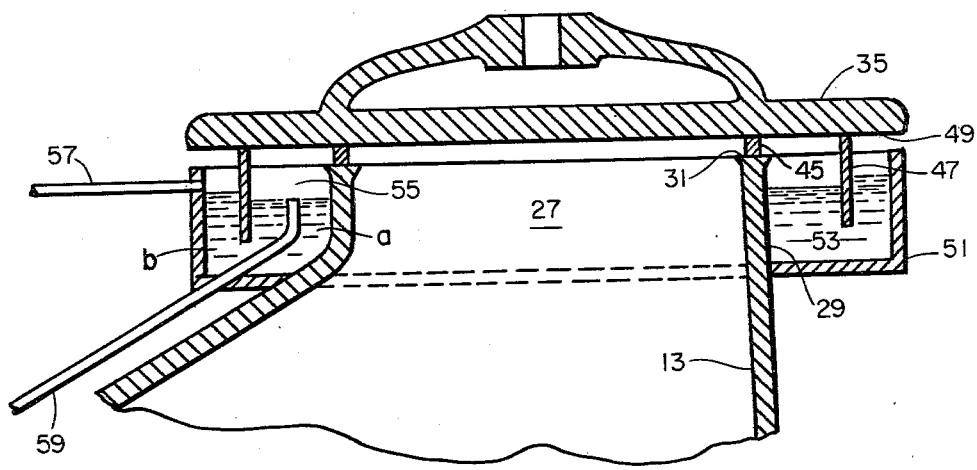
FIG. 2 is a side sectional view of the standpipe opening and cap.

To facilitate the removal of consolidated deposits which may form within a gooseneck pipe 13, a circular access opening 27 is horizontally placed in the top of the gooseneck pipe 13. Referring more specifically to FIG. 2, the opening 27 has a collar surface 29 and a lip surface 31.

A removable cap 35 is placed over the opening 27. Lever 41 is affixed to cap 35 by any conventional attachment means 37, such as a nut and bolt (refer to FIG. 1). Lever 41 is pin mounted to mount member (not shown) such that lever 41 can rotate, thereby raising or lowering cap 35. Cap 35 has two baffle rings 45 and 47 fixably mounted by any conventional means to the cap undersurface 49 (refer to FIG. 2). Baffle ring 45 conforms to the shape of and contacts with the lip surface 31 such that baffle 45 is cooperatively positioned to rest on lip surface 31.

A water ring 51 is placed around collar 29 of opening 27 such that a canal 53 is formed. Canal 53 is filled with a sealing liquor, for example, water. The baffle ring 47 is positioned on the cap surface 49 and is of sufficient length to penetrate the surface of the sealing liquor concentrically dividing canal 53 into two generally circular sections a and b. The interposition of cap undersurface 49, baffle rings 45 and 47, and contained liquor to the collared opening 27 create a chamber 55. As the pressure in the gooseneck pipe 13 rises, the pressure in chamber 55 rises due to leakage between baffle ring 45 and lip surface 31. The depth of the liquor in canal section a in response to increased pressure in chamber 55 decreases, thereby increasing the depth of the liquor in canal section b until the chamber 55 pressure is stabilized. One skilled in the art can readily determine the proper depth of penetration for baffle ring 47 and liquor depths within canal 53. Therefore, any gaseous pollutants which may seep between baffle ring 45 and lip surface 31 will be entrapped in chamber 55, derived by the interpositioning of baffle 47, cap underside 49 and the contained liquor.

To assure the maintenance of a proper liquor level and to accommodate any anomalistic pressure changes with chamber 55, lines 57 and 59 penetrate water ring 51 to the canal 53. Line 57 leads from a liquor supply (not shown), conducting liquor through line 57 to the canal 53, thereby assuring an adequate supply of liquor in canal 53. One end of line 59 is set within the canal 53 such that the opening of line 59 is below the lip surface 31. Line 59 leads from canal 53 to a second wet seal means 60.

Figure 3:
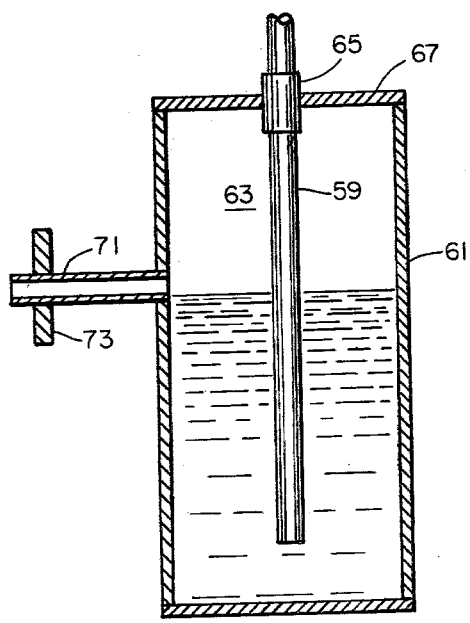
FIG. 3 is a side sectional view of a second wet seal.

Referring to FIG. 3, a second wet seal means 60 includes a housing 61 defining a cylindrical chamber 63 closed at each end. A liquor is placed in the chamber 63, which is vertically oriented. A fitting ring 65 is passed through chamber end 67 and fixably mounted by conventional means, such as welding, therein. One end of line 59 is passed through ring 65 and fixably and sealably mounted therein by any conventional means, such as welding. Line 59 penetrates the contained liquor in chamber 68. A pipe 71 carrying a mounting ring 73 is mounted by any conventional means to housing 61 in direct communication with chamber 63, horizontal to the chamber 63 contained fluid level. The other end of pipe 71 is mounted to and in direct communication with the gas collection main 19 via gas collection main opening 75 (refer to FIGS. 1 and 3). Mounting ring 73 is mounted to the gas collection main 19 by any conventional means and secures pipe 71 and housing 61. Pipe 71 is in direct communication with the interior of gas collection main 19.

In operation, as the gooseneck pipe 13 increases in pressure, leakage develops from between the interface of baffle ring 45 and lip surface 31. Chamber 55 entraps the leakage and as a result experiences a pressure increase, causing the liquor levels in canal sections a and b to realign themselves to equalize the increased chamber pressure. Line 57 supplys liquor to canal 53, thereby compensating for any liquor loss, for example, due to evaporation. Line 59, set at the desired liquor level in canal section a, drains off any excess liquor.

The continuous supply of liquor from line 57 to canal 53 also serves to minimize the escape of soluble pollutants contained in the leakage. That is, any pollutant contained in the leakage which is soluble in the particular liquor used will disolve into the liquor in canal section a, therefrom migrate to canal section b and escape to the environment. The amount of soluble pollutant escaping to the environment is dependent upon the pollutant concentration in the liquor. Therefore, the constant supply of fresh liquor via line 57 to the canal 53 maintains the degree of pollutant saturated in the liquor at a minimum, therefore minimizing pollutant escape.

Line 59, in addition to draining excess liquor from canal 53, serves in conjunction with wet seal 60 to accommodate pressure anomalies in chamber 55. The depth of the liquor contained in chamber 63 of wet seal 60 is chosen to provide sufficient back pressure in line 59 to block gas flow from chamber 55 through line 59 during normal operations (refer to FIGS. 2 and 3). However, should anomalous pressure situation occur within chamber 55, the back pressure in line 59 created as a result of the depth of liquor in chamber 63 should be overcome to permit gas from chamber 55 to pass through line 59 into chamber 63 and subsequently to the gas collection main 19 via pipe 71.

The proper depth penetration of baffle ring 47 into the liquor contained in canal 53, and the proper depth penetration of line 59 into the liquor contained in chamber 63 are readily ascertainable by one skilled in the art, predicated on the specific gravity of the liquor used, operating pressure in the gas collection main 19 and normal operating pressure in standpipe 10. An additional line 74 having a valve 75 may be utilized, line 74 tapping into line 59. Line 74 may be used to deliver, via line 59, a purge gas to act as a neutralizing agent to chamber 55; the purge gas being introduced at a slightly higher pressure than the gooseneck 13 pressure.

I claim:

1. A coke oven standpipe cap seal, operable in a range of about 1500° to 1800° F., comprising:
   (a) a refractory-lined ascension pipe;
   (b) a gooseneck pipe connected to said ascension pipe and forming an extension thereof;
   (c) a cleaning aperture, posed in a horizontal plane, and extending into said ascension pipe adjacent said gooseneck pipe;
   (d) a vertical collar surface surrounding said aperture;
   (e) a lip surface, integral with said collar surface, and forming the upper terminus of said collar surface;
   (f) a water ring, fixed to and surrounding the exterior of said ascension pipe adjacent to said collar surface and forming a liquid containing canal therewith;
   (g) a cap means, operable in conjunction with said cleaning aperture to close off said cleaning aperture;
   (h) a first baffle ring, mounted to said cap means, corresponding to said lip surface by forming contact therewith when said cap means is operated to close of said cleaning aperture;
   (i) a second baffle ring, surrounding said first baffle ring mounted to said cap means, positioned to interject into, and concentrically divide, said liquid containing canal;
   (j) means for continuously conducting a liquid into said liquid containing canal such that a portion of said second baffle ring is submerged therein when said cap means is operated to close said cleaning aperture.

2. The invention described in claim 1 further comprising:
   (a) a single conduit line operable to maintain said liquid within said liquid containing canal at a level above said portion of said second baffle ring which is submerged therein, but below said lip surface, and which operates to accommodate pressure anomalies in the chamber formed between said second baffle ring, said vertical collar, said first baffle means and said liquid, when said cap means is operated to close said cleaning aperture the first end of which penetrates through said water ring at the lowest point thereof:
   (b) an enclosed housing, through the top of which extends the second end of said single conduit line, said housing which contains a liquid, said second end of said single conduit line which is submerged in said liquid within said housing;
   (c) pipe means, extending into said housing at a level above the level of said liquid within said housing, in communication with the gas collecting main of said coke oven.

3. The invention described in claim 1 further comprising means for supplying a purge gas to said chamber.

4. The invention described in claim 2 further comprising means for supplying a purge gas to said chamber.

* * * * *